(12) United States Patent
Malhotra et al.

(10) Patent No.: US 10,528,204 B2
(45) Date of Patent: Jan. 7, 2020

(54) DIGITAL DIFFERENTIAL DETECTION FOR TOUCH SENSORS

(71) Applicant: Samsung Display Co., Ltd., Yongin-si, Gyeonggi-do (KR)

(72) Inventors: Gaurav Malhotra, Cupertino, CA (US); Kenneth Hu, Cupertino, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/977,804

(22) Filed: May 11, 2018

(65) Prior Publication Data

US 2019/0294271 A1    Sep. 26, 2019

Related U.S. Application Data

(60) Provisional application No. 62/648,312, filed on Mar. 26, 2018.

(51) Int. Cl.
*G06F 3/044* (2006.01)
*G06K 9/00* (2006.01)

(52) U.S. Cl.
CPC .......... *G06F 3/044* (2013.01); *G06K 9/00067* (2013.01)

(58) Field of Classification Search
CPC ........... G06F 3/044; G06F 2203/04107; G06F 3/0416; G06F 3/03545
See application file for complete search history.

(56) References Cited

U.S. PATENT DOCUMENTS

| | | |
|---|---|---|
| 9,734,703 B1 | 8/2017 | Chhabra |
| 2015/0138130 A1* | 5/2015 | Murphy .................. G06F 3/044 345/174 |
| 2015/0253895 A1* | 9/2015 | Kim ....................... G06F 3/044 345/174 |
| 2016/0305997 A1 | 10/2016 | Wiesbauer et al. |
| 2017/0083146 A1 | 3/2017 | Yuan et al. |
| 2017/0147206 A1* | 5/2017 | Lee ......................... G06F 3/044 |
| 2017/0336910 A1* | 11/2017 | Han ....................... G06F 3/0416 |
| 2018/0074619 A1* | 3/2018 | Chandran ............... G06F 3/044 |

FOREIGN PATENT DOCUMENTS

EP          0 629 054 B1     9/2002
WO     WO 2012/143752 A2    10/2012

* cited by examiner

*Primary Examiner* — Abbas I Abdulselam
(74) *Attorney, Agent, or Firm* — Lewis Roca Rothgerber Christie LLP

(57) ABSTRACT

A system and method for digital differential detection includes a capacitive sensor having a first node and a second node, a transmitter configured to transmit an input signal through the first node and the second node, and a receiver coupled to the first node and the second node. The receiver is configured to receive a first modified input signal from the first node and a second modified input signal from the second node. The receiver includes first and second analog-to-digital converters configured to convert the first modified input signal to a first digital signal and the second modified input signal to a second digital signal. The receiver also includes a first differencing circuit configured to calculate a first difference between the first digital signal and a second digital signal and a decision circuit configured to output a result according to the first difference.

20 Claims, 8 Drawing Sheets

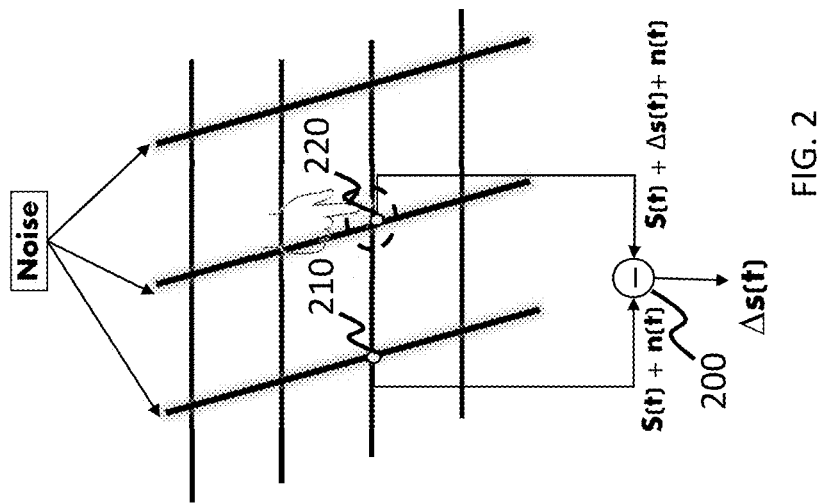
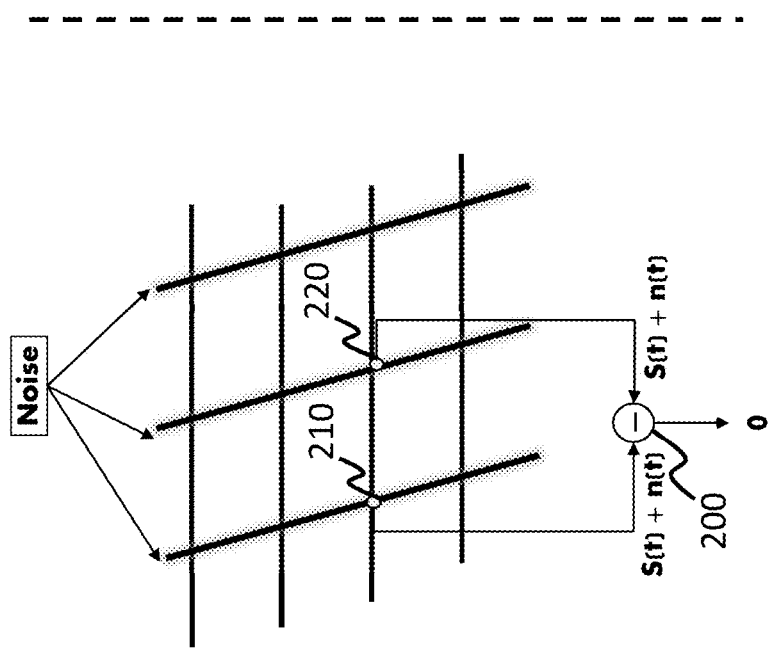
FIG. 2

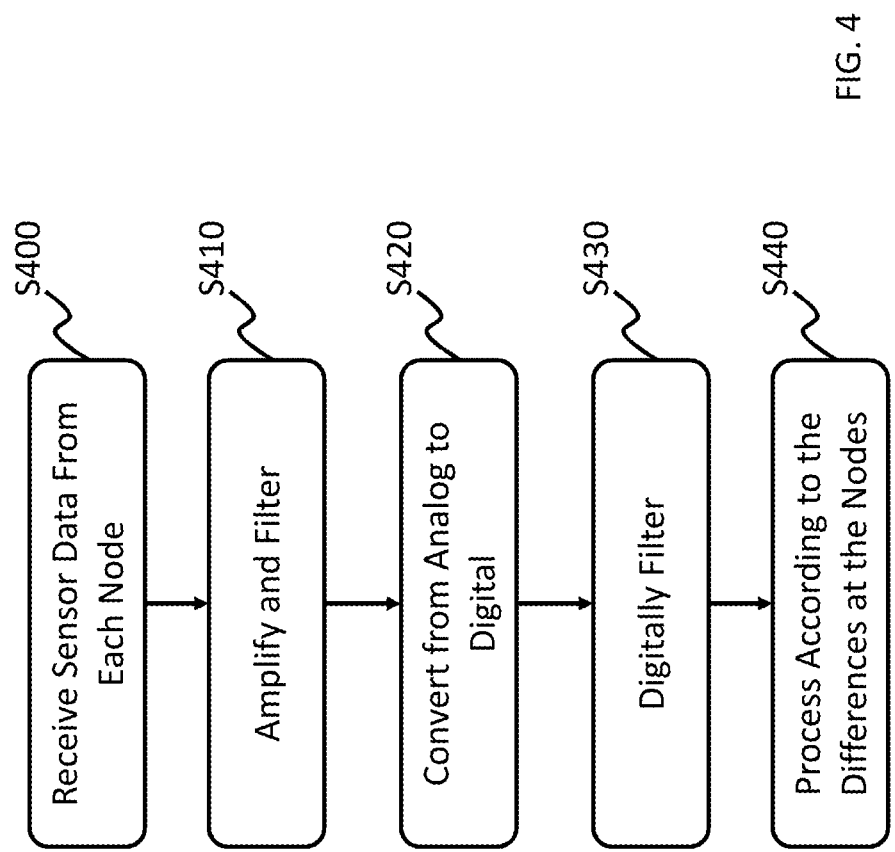

DIGITAL DIFFERENTIAL DETECTION FOR TOUCH SENSORS

CROSS-REFERENCE TO RELATED APPLICATION(S)

The present application claims priority to, and the benefit of, U.S. Provisional Patent Application No. 62/648,312, filed on Mar. 26, 2018, the contents of which are incorporated herein by reference in its entirety.

BACKGROUND

1. Field

Some embodiments of the present disclosure relate generally touch and fingerprint sensing.

2. Description of the Related Art

Touch and fingerprint detection has become increasingly important in computing devices. Mitigating noise is important for properly sensing both touch and fingerprints. Differential sensing has been used in many applications to mitigate common mode noises, however, conventional approaches have generally used analog-based circuits to compare the voltages at multiple nodes. In many implementations, analog-based comparison circuits use operation amplifiers which consume relatively high amounts of power and area. Additionally, a typical touch sensor requires roughly 50 receivers. If each receiver needs up to 10 reference nodes for providing a measurement, then 500 op-amps would be required. Most mobile devices cannot reasonably accommodate 500 additional op-amps. A different approach is therefore needed.

The above information is only for enhancement of understanding of the background of embodiments of the present disclosure, and therefore may contain information that does not form the prior art.

SUMMARY

Some embodiments of the present disclosure provide a system and method for digital differential detection for touch and fingerprint sensors.

In various embodiments, a differential capacitive sensor system includes a capacitive sensor having a first node and a second node. A transmitter is configured to transmit an input signal through the first node and the second node and a receiver is coupled to the first node and the second node and configured to receive a first modified input signal from the first node and a second modified input signal from the second node. In various embodiments the receiver has a first analog-to-digital converter configured to convert the first modified input signal to a first digital signal and a second analog-to-digital converter configured to convert the second modified input signal to a second digital signal. The receiver also includes a first differencing circuit configured to calculate a first difference between the first digital signal and a second digital signal and a decision circuit configured to output a result according to the first difference.

In various embodiments, the capacitive sensor further includes a third node and the transmitter is further configured to transmit the input signal through the third node. The receiver is further coupled to the third node and further configured to receive a third modified signal from the third node. In various embodiments, the receiver further includes a third analog-to-digital converter configured to convert the third modified input signal to a third digital signal and a second differencing circuit configured to calculate a second difference between the first digital signal and a third digital signal. In various embodiments, the decision circuit is further configured to output a result according to the first difference and the second difference.

In various embodiments, the first modified input signal includes the input signal modified by a user touching the first node and a first noise and the second modified input signal includes the input signal modified by a second noise.

In various embodiments, the receiver also includes a first digital signal processing (DSP) circuit configured to process the first digital signal and a second DSP circuit configured to process the second digital circuit.

In various embodiments, the first differencing circuit is configured to receive the first digital signal from an output of the first DSP circuit and the second digital signal from an output of the second DSP circuit.

In various embodiments the first DSP circuit has a first digital automatic gain control, a first notch filter, a first bandpass filter, and a first absolute value block, and wherein the second DSP circuit has a second digital automatic gain control, a second notch filter, a second bandpass filter, and a second absolute value block.

In various embodiments, the first and second digital signals are from an output of the first and second digital automatic gain controls, the first and second notch filters, the first and second bandpass filters, or the first and second absolute value blocks.

In various embodiments, the result indicates at least one of a user touching the first node or a feature of a fingerprint.

In various embodiments, a method for differential detection for capacitive sensors includes receiving a first modified input signal from a first node of a capacitive sensor and receiving a second modified input signal from a second node of the capacitive sensor. In various embodiments, the first modified input signal is converted to a first digital signal using a first analog-to-digital converter (ADC) and the second modified input signal is converted to a second digital signal using a second ADC. A result is processed according to a first difference, wherein the first difference comprise a difference between the first digital signal and the second digital signal.

In various embodiments a third modified input signal from a third node of the capacitive sensor is received and converted to a third digital signal. In various embodiments, the result is processed according to the first difference and a second difference, wherein the second difference comprises a difference between the first digital signal and the third digital signal.

In various embodiments, each modified input signal is amplified and filtered the in the analog domain.

In various embodiments, the first modified input signal is digitally processed using a first DSP and the second modified input signal is digitally processed using a second DSP.

In various embodiments, the first modified input signal is an input signal modified by a user touching the first node and a first noise and the second modified input signal comprises the input signal modified by a second noise.

In various embodiments, the result indicates at least one of a user is touching the first node or a feature of a fingerprint.

In various embodiments, a receiver for digital differential detection includes a first input configured to receive a first modified input signal from a first node and a second input configured to receive a second modified input signal from a second node. The receiver also includes a first analog-to-digital converter configured to convert the first modified input signal to a first digital signal and a second analog-to-digital converter configured to convert the second modified input signal to a second digital signal. In various embodiments, a first differencing circuit is configured to calculate a first difference between the first digital signal and a second digital signal and a decision circuit is configured to output a result according to the first difference.

In various embodiments, the receiver further includes a third input configured to receive a third modified signal from the third node and a third analog-to-digital converter configured to convert the third modified input signal to a third digital signal. In various embodiments, the receiver also has a second differencing circuit configured to calculate a second difference between the first digital signal and a third digital signal and the decision circuit is further configured to output a result according to the first difference and the second difference.

In various embodiments, the first modified input signal includes an input signal modified by a user touching the first node and a first noise and the second modified input signal comprises the input signal modified by a second noise.

In various embodiments, the receiver further includes a first digital signal processing (DSP) circuit configured to process the first digital signal and a second DSP circuit configured to process the second digital circuit.

In various embodiments, the first differencing circuit is configured to receive the first digital signal from an output of the first DSP circuit and the second digital signal from an output of the second DSP circuit.

In various embodiments, the first DSP circuit includes a first digital automatic gain control, a first notch filter, a first bandpass filter, and a first absolute value block, and the second DSP circuit includes a second digital automatic gain control, a second notch filter, a second bandpass filter, and a second absolute value block.

BRIEF DESCRIPTION OF THE DRAWINGS

Some embodiments can be understood in more detail from the following description taken in conjunction with the accompanying drawings, in which:

FIG. 2 depicts a capacitive sensor with a differential circuit according to various embodiments;

FIG. 4 depicts a method for detecting touch and fingerprints using differential sensing according to various embodiments;

DETAILED DESCRIPTION

Figure 1:
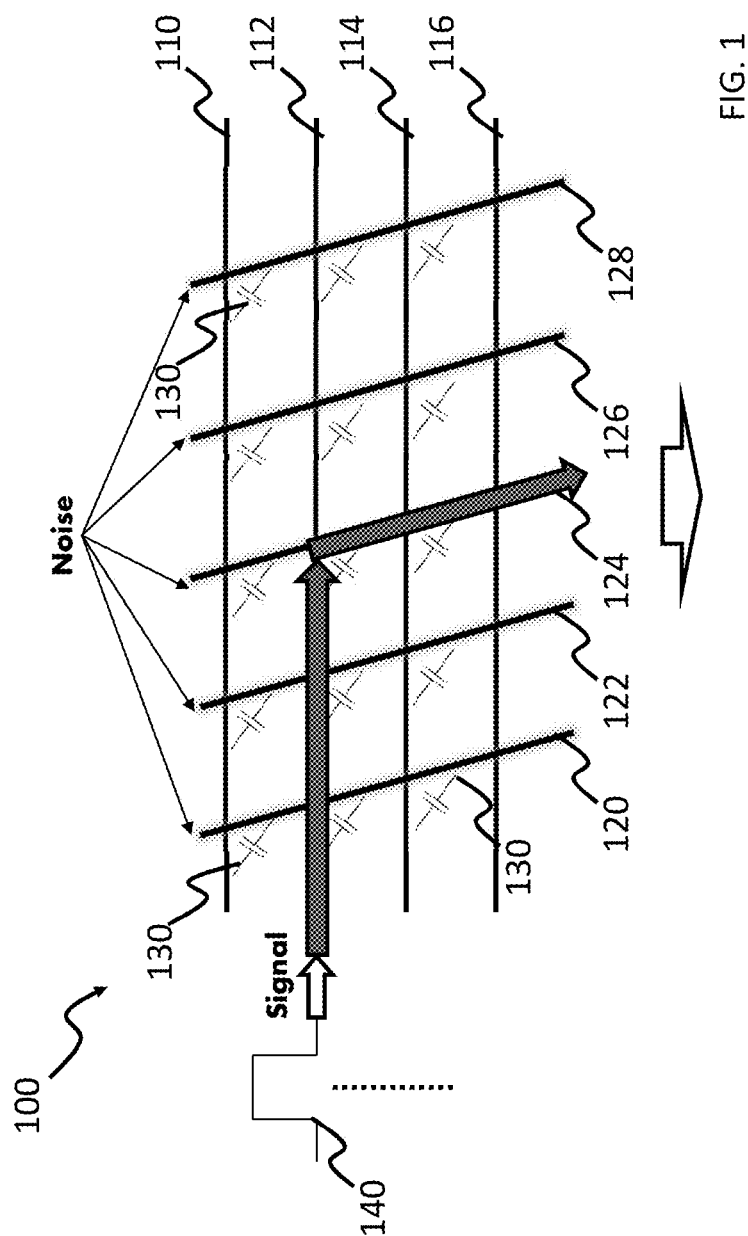
FIG. 1 depicts an example capacitive sensor according to various embodiments.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

Embodiments of the present disclosure include a system and method for differential detection for capacitive sensors such as touch and fingerprint sensors. In various embodiments, the system provides for noise mitigation by utilizing differential voltages at multiple reference nodes in a touch or fingerprint sensor. In various embodiments, the analog values from each node are converted into digital signals and the difference calculations are done in the digital domain. For example, in various embodiments, the system receives voltages at two or more nodes in a capacitive touch or capacitive fingerprint sensing hardware. The voltages are converted to the digital domain and the difference is taken. A decision regarding the touch or fingerprint may then be made.

FIG. 1 depicts an example capacitive sensor according to various embodiments.

Referring to FIG. 1, in various embodiments, the system for differential touch and fingerprint detection includes a capacitive touch or fingerprint sensor 100. In various embodiments the capacitive touch or fingerprint sensor 100 includes a matrix of rows 110-116 and columns 120-128 made of a conductive material. Each intersection (e.g. node) of the rows 110-116 and columns 120-128 forms a capacitor 130. In various embodiments, the rows 110-116 and columns 120-128 may be spaced according to the sensing application. For example, in various embodiments a fingerprint sensor may include a more tightly spaced matrix than a touch sensor. In various embodiments, one or more transmitters may be connected to the rows 110-116 and each transmitter is configured to apply a signal 140. A receiver may be coupled to each of the columns 120-128 and is configured to receive a modified version of the signal 140 (e.g. due to outside sources). For example, when a user touches the sensor 100, the capacitance at each node being touched is modified and the signal 140 is modified according to the change of capacitance. The corresponding receiver receives and processes the modified signal and detects the touch. Due to various reasons, the capacitive touch or fingerprint sensor 100 also receives noise from outside sources. This noise may cause false positive touch readings, incorrect fingerprint scans, and other issues.

FIG. 2 depicts a capacitive sensor with a differential circuit according to various embodiments.

Referring to FIG. 2, in various embodiments, the system for differential touch and fingerprint detection takes differential signals to mitigate noise. For example, a receiver may be configured to measure the signals on each column of the capacitive sensor. In some embodiments, the capacitive sensor may have a receiver at each column. For example, in a mobile display, a capacitive touch sensor may include roughly 50 columns and 50 corresponding receivers. In various embodiments, one or more differencing circuits 200 may be connected to the output of each receiver. For example, in various embodiments the system may have an input signal of S(t) that is generated by a transmitter and supplied to each of the rows in the capacitive sensor 100. The capacitive sensor 100 may also receive noise n(t) from one or more outside sources (e.g. a nearby object). In some embodiments, when nothing is touching the capacitive sensor 100, each of the nodes 210, 220 has the input signal S(t) and the noise n(t). In most cases, the noise on each column is roughly the same. Thus, the differencing circuit will output the difference between the noise on each column which will be approximate zero. When a touch (e.g. by a finger, stylus, or other capacitance altering device) is introduced to node 220 of the capacitive sensor 100, the signal received at the receiver is modified due to the change of capacitance. Thus, the difference circuit 200 will cancel out the noise n(t) and the input signal S(t) and outputs the change introduced by the touch Δs(t).

Figure 3:
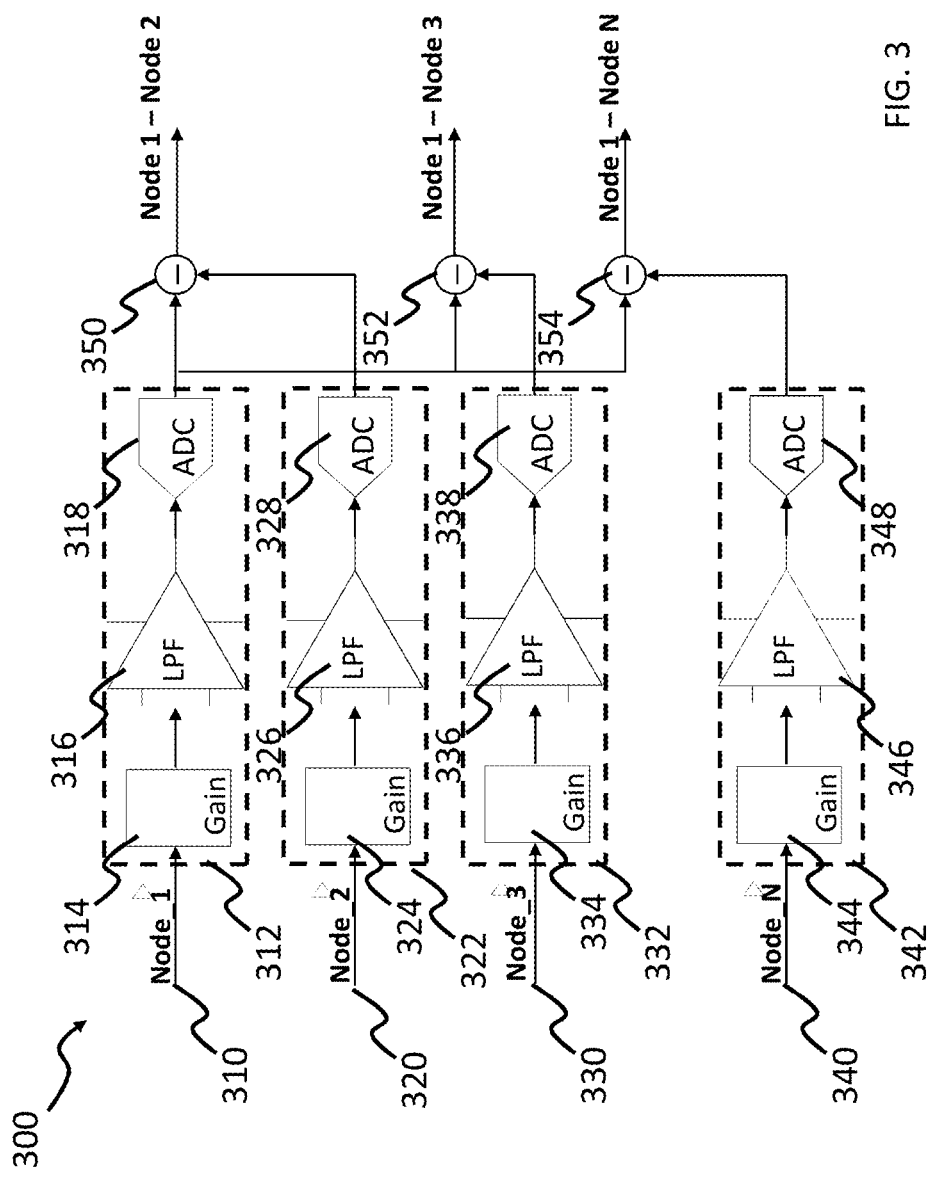
FIG. 3 depicts a system for differential touch and fingerprint detection according to various embodiments.

FIG. 3 depicts a system for differential touch and fingerprint detection according to various embodiments. FIG. 4 depicts a method for detecting touch and fingerprints using differential sensing according to various embodiments.

Referring to FIGS. 3 and 4, in various embodiments, a differential sensing system 300 is configured to receive signals from two or more nodes, convert the signals to the digital domain, and perform a differencing calculation on the signals. For example, in various embodiments, the system may have a first node 310 which receives a first signal, a second node 320 which receives a second signal, a third node 330 which receives a third signal, and an nth node 340 which receives an nth signal (S400). As discussed above, each of the signals may be an input signal that is modified by a user's touch and/or by outside noise. For example, the first signal may include a touch modified signal that is the input signal modified by a user's touch at the first node 310 and noise, while the other signals may include the input signal and noise. In various embodiments, the touch screen to be able to resolve touches in at least 10 concurrent locations (e.g., for 10 fingers). Therefore, in various embodiments, the system may include 10 nodes (e.g. a node for each finger).

Each of the nodes maybe connected to an analog circuit 312, 322, 332, 342 configured to amplify and filter the received signal at the node. For example, in various embodiments, each receiver includes an amplifier with gain control 314, 324, 334, 344, a low-pass filter 316, 326, 336, 346, and an analog-to-digital converter 318, 328, 338, 348. In various embodiments, each amplifier with gain control 314, 324, 334, 344 is configured to receive an input signal and adjust the gain to an expected range. The gain adjusted signal is then provided to a low-pass filter 316, 326, 336, 346 for removing high frequency noise (S410). Each ADC 318, 328, 338, 348 converts the analog signal to a digital signal (S420). In various embodiments, the digital signals may be digitally processed which may include, for example, further filtering using one or more digital filters (S430). The difference between the signals received at each of the nodes may then be calculated using a digital differencing circuit 350-354. For example, the differential sensing system may compare the signal of node 1 with the signals at each of the other nodes (e.g. Node 1 Node 2; Node 1-Node 3; and Node 1-Node N). The results of the comparisons may be then processed to achieve a final reading and determination (S440). For example, for touch sensing applications, each comparison result may be compared to a threshold and a touch may be reported only when at least one of the differenced signals exceeds a threshold. In other embodiments, a touch may be reported when two or more comparisons exceed the thresholds or when an average value exceeds a threshold. In a fingerprint sensing application, multiple differenced signals may be averaged and the average signal may be utilized to indicate a feature of a fingerprint such as the height of a fingerprint ridge or depth of a fingerprint valley.

Figure 5A:
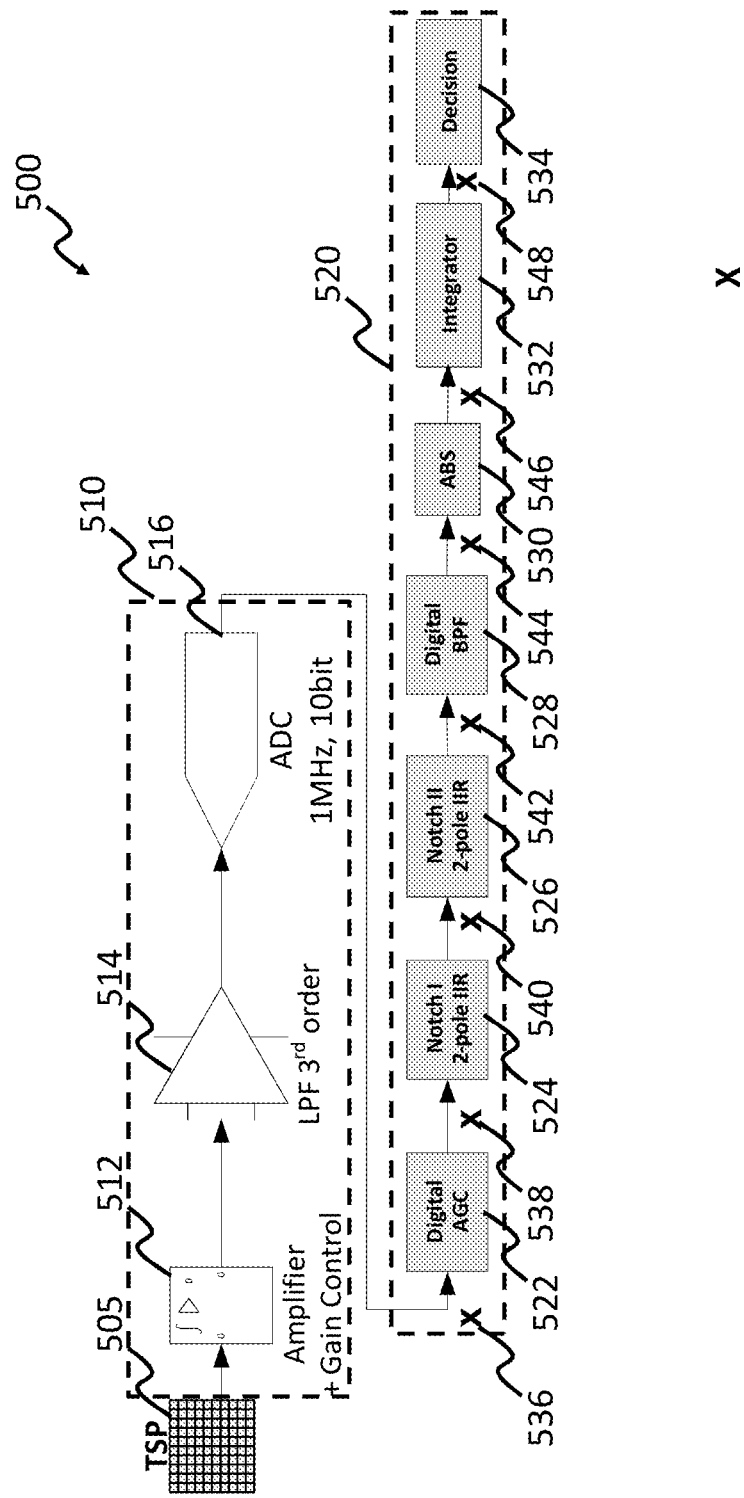
FIG. 5A depicts analog and digital circuitry from a receiver according to various embodiments.

FIG. 5A depicts analog and digital circuitry from a receiver according to various embodiments.

Referring to FIG. 5A, in various embodiments, the system for differential touch and fingerprint detection includes a receiver 500 coupled to a touch screen panel (TSP) 505. In various embodiments, the receiver includes analog circuits 510 and digital circuits 520 (e.g. Digital Signal Processing (DSP) circuits) for receiving and processing touches and fingerprints. In various embodiments, as discussed above, the analog circuits 510 may include a gain control 512, a low pass filter 514, and an analog-to-digital converter (ADC) 516. In various embodiments, the low pass filter 514 may, for example, be a third order low pass filter. In various embodiments, the ADC 516 may, for example, be a 1 MHz 10 bit ADC.

In various embodiments, the output of the analog circuits 510 is provided to the digital circuits 520 for performing digital signal processing. In various embodiments, the digital circuits 520 are configured to condition the incoming signal from the TSP 505 for making determinations (e.g. whether a touch was detected). For example, in various embodiments, the digital circuits 520 include an automatic gain control 522 for adjusting the incoming digital signal to a desired value range. Digital notch 524, 526 and bandpass 528 filters may be utilized to further filter undesired signals from the received signal. The absolute value may be taken at an ABS block 530 and the result integrated at an integrator 532. The output is then provided to a decision circuit 534 for resolving whether a touch occurred or for resolving a fingerprint.

In various embodiments, as described above, the receiver 500 may be coupled to one or more other nodes for differential processing. In various embodiments, the difference calculation between nodes may be taken at any of a plurality of locations 536-548 in the digital processing chain. For example, the each of the digital circuits may be coupled at the location 536 and the value of at that location may be differenced and the difference value may be processed by the remainder of the digital circuit 520. In various embodiments, each of the locations 536-548 may have a different bit width. Thus, the differencing circuits may be configured according to the location of where digital signal is taken.

Figure 5B:
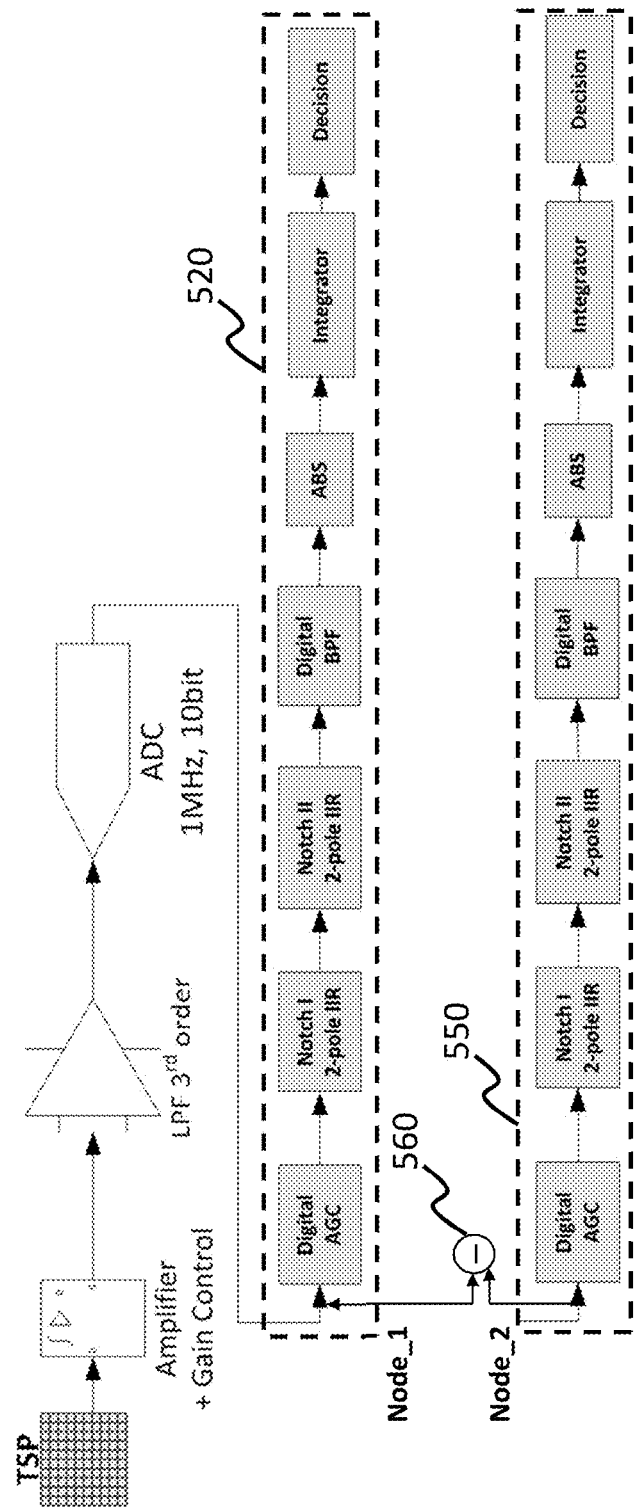
FIG. 5B depicts the example receiver analog and digital circuitry along with the digital circuitry from a second receiver according to various embodiments.

FIG. 5B depicts the example receiver analog and digital circuitry along with the digital circuitry from a second receiver according to various embodiments.

Referring to FIG. 5B, the differential detection system is configured to take the difference of the voltages at multiple nodes. For example, in various embodiments, the signal received at Node 1 may be compared with the signal received at Node 2. As discussed above, the difference is taken in the digital domain. In various embodiments, the difference between the nodes is taken using the differencing circuit 560 as soon as the signals have been converted from analog to digital. In various embodiments, the differencing circuit 560 is implemented using digital logic.

Figure 6A:
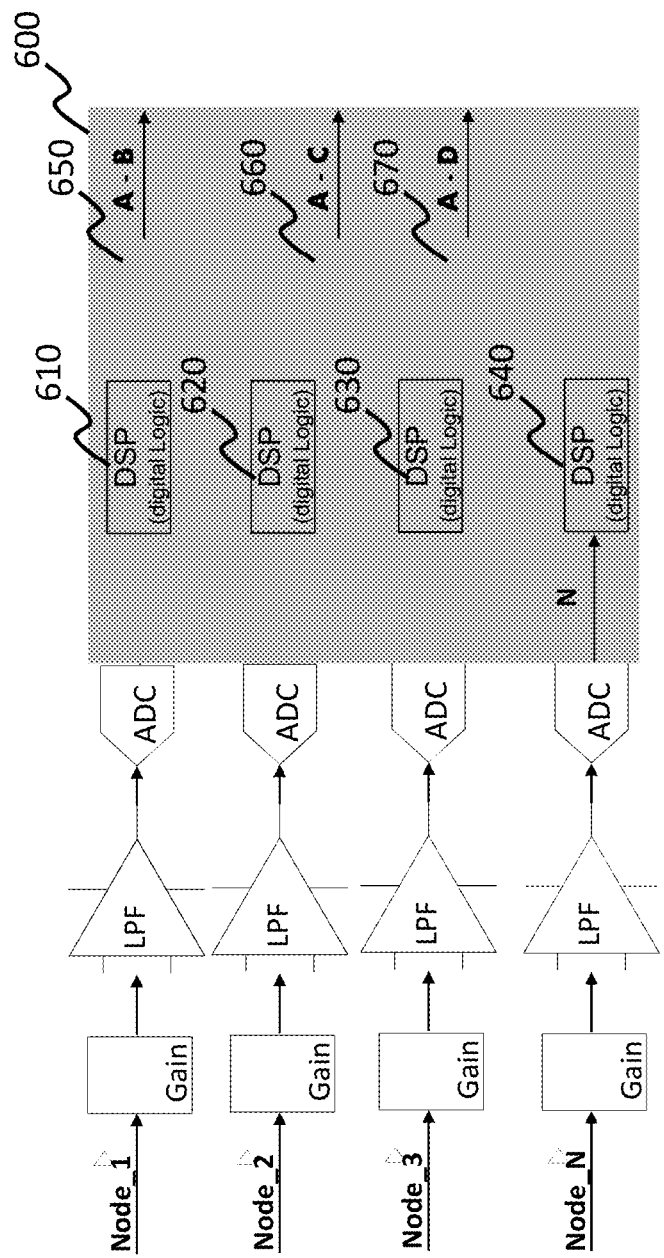
FIG. 6A depicts an example embodiment where the differences are taken after the output of the receiver's digital circuits.
Figure 6B:
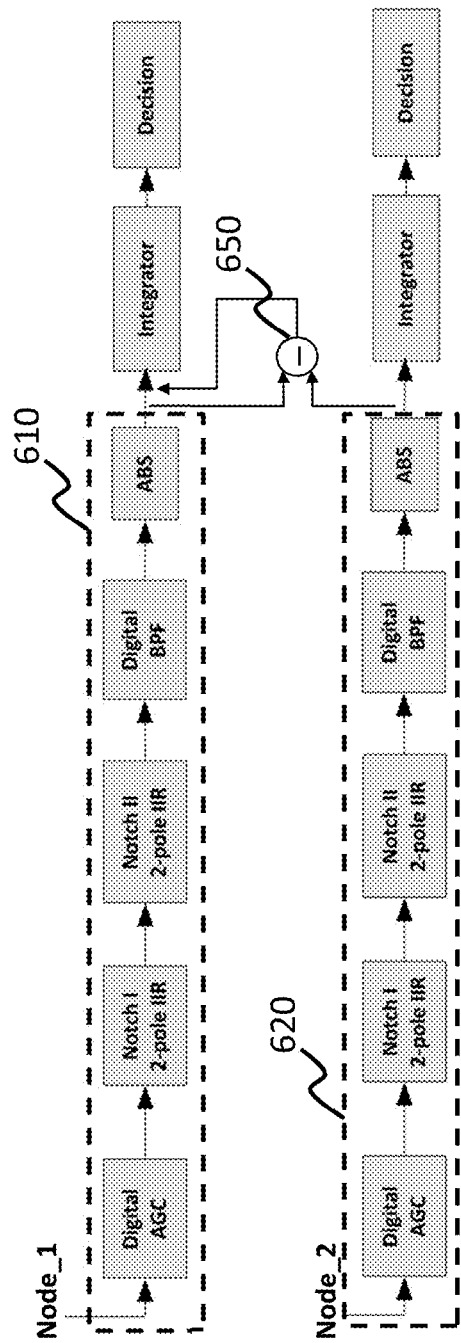
FIG. 6B depicts the example receiver analog and digital circuitry along with the digital circuitry from a second receiver according to various embodiments.

FIG. 6A depicts an example embodiment where the differences are taken after the output of the receiver's digital circuits. FIG. 6B depicts the example receiver analog and digital circuitry along with the digital circuitry from a second receiver according to various embodiments.

Referring to FIGS. 6A and 6B, in various embodiments, the system may perform the differencing operations at any intermediate point in the digital signal processing chain or after the chain using the digital circuits described above. For example, the DSP logic can be considered a linear system despite the presence of non-linear elements is the chain. Thus, the difference may be taken at any point in the digital signal processing chain including at the beginning of the chain or at the end of the chain. For example, the digital circuits 600 include first DSP circuits 610 for processing signals received at Node 1, second DSP circuits 620 for processing signals received at Node 2, third DSP circuits 630 for processing signals received at Node 3, and Nth DSP circuits 640 for processing signals received at Node N. The processed signals may then be differenced at the differencing circuits 650-670. Since the digital chain can be viewed as linear, the difference may be taken at the output of the DSP circuits 620 (e.g. after the non-linear absolute value block). By taking the difference after the DSP circuits, the digital logic required to take the differences may be reduced by, for example, an order of magnitude.

In the preceding description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A differential capacitive sensor system comprising:
    a capacitive sensor comprising a first node and a second node;
    a transmitter configured to transmit an input signal through the first node and the second node; and
    a receiver coupled to the first node and the second node and configured to receive a first modified input signal from the first node and a second modified input signal from the second node, wherein the receiver comprises:
        a first analog-to-digital converter configured to convert the first modified input signal to a first digital signal;
        a second analog-to-digital converter configured to convert the second modified input signal to a second digital signal;
        a first differencing circuit configured to calculate a first difference between the first digital signal and a second digital signal by subtracting the second digital signal from the first digital signal; and
        a decision circuit configured to output a result according to the first difference.

2. The differential capacitive sensor system of claim 1, wherein:
    the capacitive sensor further comprises a third node;
    the transmitter is further configured to transmit the input signal through the third node; and
    the receiver is further coupled to the third node and further configured to receive a third modified signal from the third node, wherein the receiver further comprises:
        a third analog-to-digital converter configured to convert the third modified signal to a third digital signal; and
        a second differencing circuit configured to calculate a second difference between the first digital signal and a third digital signal; and
        wherein the decision circuit is further configured to output a result according to the first difference and the second difference.

3. The differential capacitive sensor system of claim 1, wherein:
    the first modified input signal comprises the input signal modified by a user touching the first node and a first noise; and
    the second modified input signal comprises the input signal modified by a second noise.

4. The differential capacitive sensor system of claim 1, wherein the receiver further comprises:
    a first digital signal processing (DSP) circuit configured to process the first digital signal; and
    a second DSP circuit configured to process the second digital signal.

5. The differential capacitive sensor system of claim 4, wherein the first differencing circuit is configured to receive the first digital signal from an output of the first DSP circuit and the second digital signal from an output of the second DSP circuit.

6. The differential capacitive sensor system of claim 4, wherein the first DSP circuit comprises a first digital automatic gain control, a first notch filter, a first bandpass filter, and a first absolute value block, and wherein the second DSP circuit comprises a second digital automatic gain control, a second notch filter, a second bandpass filter, and a second absolute value block.

7. The differential capacitive sensor system of claim 6, wherein the first and second digital signals are from an output of the first and second digital automatic gain controls, the first and second notch filters, the first and second bandpass filters, or the first and second absolute value blocks.

8. The differential capacitive sensor system of claim 1, wherein the result indicates at least one of a user touching the first node or a feature of a fingerprint.

9. A method for differential detection for capacitive sensors comprising:
    receiving a first modified input signal from a first node of a capacitive sensor;
    receiving a second modified input signal from a second node of the capacitive sensor;
    converting the first modified input signal to a first digital signal using a first analog-to-digital converter (ADC);
    converting the second modified input signal to a second digital signal using a second ADC;
    processing a result according to a first difference, wherein the first difference is calculated by subtracting the second digital signal from the first digital signal.

10. The method of claim 9, further comprising:
    receiving a third modified input signal from a third node of the capacitive sensor;
    converting the third modified input signal to a third digital signal; and wherein processing the result further comprises processing the result according to the first difference and a second difference, wherein the second difference comprises a difference between the first digital signal and the third digital signal.

11. The method of claim 9, further comprising amplifying and filtering the first and second modified input signals in the analog domain.

12. The method of claim 9, further comprising digitally processing the first modified input signal using a first DSP and digitally processing the second modified input signal using a second DSP.

13. The method of claim 9, wherein:
the first modified input signal comprises an input signal modified by a user touching the first node and a first noise; and
the second modified input signal comprises the input signal modified by a second noise.

14. The method of claim 9, wherein the result indicates at least one of a user is touching the first node or a feature of a fingerprint.

15. A receiver for digital differential detection comprising:
a first input configured to receive a first modified input signal from a first node;
a second input configured to receive a second modified input signal from a second node;
a first analog-to-digital converter configured to convert the first modified input signal to a first digital signal;
a second analog-to-digital converter configured to convert the second modified input signal to a second digital signal;
a first differencing circuit configured to calculate a first difference between the first digital signal and a second digital signal by subtracting the second digital signal from the first digital signal; and
a decision circuit configured to output a result according to the first difference.

16. The receiver for digital differential detection of claim 15, wherein the receiver further comprises:
a third input configured to receive a third modified signal from a third node;
a third analog-to-digital converter configured to convert the third modified signal to a third digital signal;
a second differencing circuit configured to calculate a second difference between the first digital signal and a third digital signal; and
wherein the decision circuit is further configured to output a result according to the first difference and the second difference.

17. The receiver for digital differential detection of claim 15, wherein:
the first modified input signal comprises an input signal modified by a user touching the first node and a first noise; and
the second modified input signal comprises the input signal modified by a second noise.

18. The receiver for digital differential detection of claim 15, wherein the receiver further comprises:
a first digital signal processing (DSP) circuit configured to process the first digital signal; and
a second DSP circuit configured to process the second digital signal.

19. The receiver for digital differential detection of claim 18, wherein the first differencing circuit is configured to receive the first digital signal from an output of the first DSP circuit and the second digital signal from an output of the second DSP circuit.

20. The receiver for digital differential detection of claim 18, wherein the first DSP circuit comprises a first digital automatic gain control, a first notch filter, a first bandpass filter, and a first absolute value block, and wherein the second DSP circuit comprises a second digital automatic gain control, a second notch filter, a second bandpass filter, and a second absolute value block.

\* \* \* \* \*

UNITED STATES PATENT AND TRADEMARK OFFICE
CERTIFICATE OF CORRECTION

| | |
|---|---|
| PATENT NO. | : 10,528,204 B2 |
| APPLICATION NO. | : 15/977804 |
| DATED | : January 7, 2020 |
| INVENTOR(S) | : Gaurav Malhotra and Kenneth Hu |

It is certified that error appears in the above-identified patent and that said Letters Patent is hereby corrected as shown below:

On the Title Page
Column 1, item (72), Inventors, Line 2      delete "Kenneth"
and insert -- Keshun --

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*